United States Patent
Sethi et al.

(10) Patent No.: US 7,524,141 B2
(45) Date of Patent: Apr. 28, 2009

(54) TREATMENT OF ENVIRONMENTAL CONTAMINANTS

(75) Inventors: Dalbir S. Sethi, Cranbury, NJ (US);
Frank C. Sessa, Wyncote, PA (US);
Lawrence J. Kinsman, Madison, WI (US); Philip A. Block, Chester Heights, PA (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 12/187,693

(22) Filed: Aug. 7, 2008

(65) Prior Publication Data

US 2008/0292404 A1    Nov. 27, 2008

Related U.S. Application Data

(63) Continuation of application No. 10/565,564, filed as application No. PCT/US2004/024274 on Jul. 28, 2004, now abandoned.

(60) Provisional application No. 60/491,007, filed on Jul. 29, 2003.

(51) Int. Cl.
*B09B 1/00* (2006.01)

(52) U.S. Cl. ................................. 405/128.75; 588/320
(58) Field of Classification Search ............ 405/128.75; 588/320, 405, 406
See application file for complete search history.

(56) References Cited

U.S. PATENT DOCUMENTS

| 5,749,201 | A | * | 5/1998 | Cochrane ..................... 53/281 |
| 5,849,201 | A | | 12/1998 | Bradley |
| 6,019,548 | A | | 2/2000 | Hoag |
| 6,160,194 | A | * | 12/2000 | Pignatello ................ 405/128.5 |
| 6,569,353 | B1 | | 5/2003 | Giletto |

FOREIGN PATENT DOCUMENTS

| JP | 2001207224 A | 7/2001 |
| JP | 2002136961 A | 5/2002 |

* cited by examiner

*Primary Examiner*—John Kreck

(57) ABSTRACT

Contaminants, such as volatile organic compounds, are removed from an environmental medium, such as contaminated soil, rock, groundwater, waste water and the like, by treatment with a combination of a persulfate, such as a sodium persulfate, and hydrogen peroxide.

16 Claims, No Drawings

TREATMENT OF ENVIRONMENTAL CONTAMINANTS

This application is a continuation of U.S. application Ser. No. 10/565,564 filed Aug. 18, 2006, abandoned, which is the National Stage of International Application No. PCT/US2004/024274, filed Jul. 28, 2004, which claims the benefit of U.S. Provisional Application No. 60/491,007, filed Jul. 29, 2003.

FIELD OF THE INVENTION

The present invention relates to the in situ and ex situ oxidation of organic compounds in soils, groundwater, process water and wastewater and especially relates to the in situ oxidation of volatile and semi-volatile organic compounds, pesticides and other recalcitrant organic compounds in soil and groundwater.

BACKGROUND OF THE INVENTION

The presence of volatile organic compounds (VOCs), semi-volatile organic compounds (SVOCs), pesticides, polychlorinated biphenyls (PCBs), polyaromatic hydrocarbons (PAHs) and total petroleum hydrocarbons (TPHs) in subsurface soils and groundwater is a well-documented and extensive problem in industrialized and industrializing countries.

Notable among these are the volatile organic compounds or VOCs which include any at least slightly water soluble chemical compound of carbon, with a Henry's Law Constant greater than $10^{-7}$ atm m$^3$/mole, which is toxic or carcinogenic, is capable of moving through the soil under the influence of gravity and serving as a source of water contamination by dissolution into water passing through the contaminated soil due to its solubility, including, but not limited to, chlorinated solvents such as trichloroethylene (TCE), vinyl chloride, tetrachloroethylene (PCE), methylene chloride, 1,2-dichloroethane, 1,1,1-trichloroethane (TCA), 1,1-dichloroethane, 1,1-dichloroethene, carbon tetrachloride, benzene, chloroform, chlorobenzenes, and other compounds such as ethylene dibromide, and methyl tertiary butyl ether.

In many cases discharge of VOCs and other contaminants into the soil leads to contamination of aquifers resulting in potential public health impacts and degradation of groundwater resources for future use. Treatment and remediation of soils contaminated with VOCs and other organic contaminants have been expensive, require considerable time, and in many cases are incomplete or unsuccessful. Treatment and remediation of compounds that are either partially or completely immiscible with water (i.e., Non Aqueous Phase Liquids or NAPLs) have been particularly difficult. Also treatment of highly soluble but biologically stable organic contaminants such as MTBE and 1,4-dioxane are also quite difficult with conventional remediation technologies. This is particularly true if these compounds are not significantly naturally degraded, either chemically or biologically, in soil environments. NAPLs present in the subsurface can be toxic to humans and other organisms and can slowly release dissolved aqueous or gas phase volatile organic compounds to the groundwater resulting in long-term (i.e., decades or longer) sources of chemical contamination of the subsurface. In many cases subsurface groundwater contaminant plumes may extend hundreds to thousands of feet from the source of the chemicals resulting in extensive contamination of the subsurface. These chemicals may then be transported into drinking water sources, lakes, rivers, and even basements of homes through volatilization from groundwater.

The U.S. Environmental Protection Agency (USEPA) has established maximum concentration limits for various hazardous compounds. Very low and stringent drinking water limits have been placed on many halogenated organic compounds. For example, the maximum concentration limits for solvents such as trichloroethylene, tetrachloroethylene, and carbon tetrachloride have been established at 5 .mu.g/L, while the maximum concentration limits for chlorobenzenes, polychlorinated biphenyls (PCBs), and ethylene dibromide have been established by the USEPA at 100 .mu.g/L, 0.5 .mu./L, and 0.05 .mu.g/L, respectively. Meeting these cleanup criteria is difficult, time consuming, costly, and often virtually impossible using existing technologies.

Many methods exist for the remediation of soil, groundwater and wastewater to meet the clean-up standards. Examples include dig-and-haul, pump-and-treat, biodegradation, sparging, and vapor extraction. However, meeting stringent clean-up standards is often costly, time-consuming, and often ineffective for many compounds that are recalcitrant—i.e. not responsive to such treatment.

Chemical oxidation, either applied in situ or ex situ of the subsurface or waste stream, is an approach to treat contaminants with strong oxidizing chemicals, with the ultimate goal of complete mineralization, or conversion to carbon dioxide and water. Examples of oxidants that have been utilized for this purpose include Fenton's chemistry (activated hydrogen peroxide), permanganate and ozone. Persulfates, and in particular sodium persulfate, have more recently been suggested for use in environmental remediation through chemical oxidation.

The use of hydrogen peroxide, and in particular metal-activated hydrogen peroxide (Fenton's chemistry) has been employed in the field application of chemical oxidation remediation over the past decade. Metals and chelated metals have been utilized to generate hydroxy radicals, which are capable of destroying a wide range of contaminants. However, there is significant demand on the hydrogen peroxide form nascent organics in the soil or groundwater, and from reduced metals. Thus, a significant amount of the hydrogen peroxide is expended on non-critical reaction pathways. In addition, transportation of the metal activators within the environmental medium is a key technological factor in the efficient use of hydrogen peroxide as an oxidant. Also, there is little data demonstrating that Fenton's chemistry is effective against highly recalcitrant contaminants.

SUMMARY OF THE INVENTION

The present invention relates to a method for the treatment of contaminated soil, sediment, clay, rock, and the like containing organic contaminants, as well as the treatment of groundwater, process water or wastewater containing organic contaminants.

The method of the present invention uses a combination of water soluble oxidants, namely a persulfate and hydrogen peroxide. The combination is introduced into soil or water in amounts, under conditions and in a manner which assures that the oxidizing compounds are able to contact and oxidize most, and preferably substantially all, the target contaminants rendering the target contaminants harmless.

In a preferred embodiment the composition of the present invention is introduced into soil in sufficient quantities to satisfy the soil oxidant demand and to oxidize the target contaminants and render them harmless. This methodology may also be used ex situ to treat quantities of contaminated soil which have been removed from the ground.

DESCRIPTION OF THE PREFERRED EMBODIMENTS

In accordance with the present invention it has been found that a broad range of contaminants in an environmental medium can be effectively reduced or removed by treatment with a composition comprising a persulfate and hydrogen peroxide. Further improvements have been found when an activator is included in the composition.

Contaminants susceptible to treatment by the compositions of the present invention include: volatile organic compounds (VOCs); semi volatile organic compounds (SVOCs); polychlorinated biphenyls (PCBs); polyaromatic hydrocarbons (PHHs); total petroleum hydrocarbons (TPHs) including benzene, toluene, xylene and ethylbenzene; methyl t-butyl ether (MTBE); brominated solvents; 1,4-dioxane; and pesticides (insecticides, herbicides, etc.).

In accordance with the method of the present invention the contaminants are treated in an environmental medium. As used herein "environmental medium" refers to an environment where contaminants are found including, without limitation, soil, rock, groundwater, contaminated plumes, process water, waste water and the like.

The process of the present invention may be carried out in situ or ex situ. In situ treatment is conducted in the physical environment where the contaminant(s) are found. Ex situ treatment involves removal of the contaminated medium from the location where it is found and treatment at a different location.

In accordance with one embodiment of the present invention, the oxidation of volatile organic compounds at a contaminated site is accomplished by the injection of a combination of a persulfate and hydrogen peroxide into soil.

In a preferred form of the invention, sodium persulfate ($Na_2S_2O_8$) is introduced into contaminated soil along with hydrogen peroxide.

For in situ soil treatment, injection rates must be chosen based upon the hydro geologic conditions, that is, the ability of the oxidizing solution to displace, mix and disperse with existing groundwater and move through the soil. Additionally, injection rates must be sufficient to satisfy the soil oxidant demand and chemical oxidant demand in a realistic time frame. It is advantageous to clean up sites in both a cost effective and timely manner. Careful evaluation of site parameters is crucial. It is well known that soil permeability may change rapidly both as a function of depth and lateral dimension. Therefore, injection well locations are also site specific. Proper application of any remediation technology depends upon knowledge of the subsurface conditions, both chemical and physical, and this process is not different in that respect.

While sodium persulfate is the preferred persulfate compound for oxidizing the contaminants, other solid phase water soluble persulfate compounds can be used. These include monopersulfates and dipersulfates. Dipersulfates are preferred because they are inexpensive and survive for long periods in the groundwater saturated soil under typical site conditions.

The most preferred dipersulfate is sodium persulfate as it has the greatest solubility in water and is least expensive. Moreover, it generates sodium and sulfate upon reduction, both of which are relatively benign from environmental and health perspectives. Potassium persulfate and ammonium persulfate are examples of other persulfates which might be used. Potassium persulfate, however, is an order of magnitude less soluble in water than sodium persulfate; and ammonium persulfate is even less desirable as it may decompose into constituents which are potential health concerns.

In accordance with the present invention the persulfate is used in combination with hydrogen peroxide.

The hydrogen peroxide may contain an organic or inorganic compound such as phosphoric acid, which can generate hydrogen ions. The hydrogen peroxide may be introduced into the soil, groundwater or wastewater, either in combination with the persulfates, or sequentially, either before, after or in repeated sequential steps to the persulfate introduction. Enough of the persulfate and hydrogen peroxide need to be introduced to overcome the soil oxidant demand and to reduce the concentration of the contaminants to the desired levels.

The amounts of oxidants used are not critical, except it is preferred that enough is present to satisfy substantially all the soil oxidant demand and to remove the contaminants to acceptable levels, or as close thereto as possible. Thus, any amount within a mole ratio of persulfate to hydrogen peroxide of from 1:20 to 20:1 may be used. Preferred results are achieved with a mole ratio of persulfate to hydrogen peroxide of from 1:10 to 10:1.

The preferred concentrations are a function of the soil characteristics, including the site-specific oxidant demands. Hydrogeologic conditions govern the rate of movement of the chemicals through the soil, and those conditions must be considered together with the soil chemistry to understand how best to perform the injection. The techniques for making these determinations and performing the injections are well known in the art. For example, wells could be drilled at various locations in and around the suspected contaminated site to determine, as closely as possible, where the contamination is located. Core samples would be withdrawn, being careful to protect the samples from atmospheric oxidation. The samples would be used to determine soil oxidant demand and chemical (i.e. VOC) oxidant demand existing in the subsurface. The precise chemical compounds in the soil and their concentration would also be determined. Contaminated groundwater would be collected. Oxidants would be added to the collected groundwater during laboratory treatability experiments to determine which compounds are destroyed in the groundwater. It would then be determined whether the same oxidants are able to destroy those chemicals in the soil environment.

The goal is for the concentration in the injected solution to be just enough to result in the reaction front traveling at the same velocity as the groundwater in the saturated zone, or as close as possible thereto. (The saturated soil zone is the zone of soil which lies below the water table and is fully saturated. This is the region in which groundwater exists and flows.) In certain saturated zones where the natural velocity of the groundwater is too slow for the purposes of treatment within a certain timeframe, the velocity of groundwater can be increased by increasing the flow rate of the injected persulfate solution or installation of groundwater extraction wells to direct the flow of the injected solution. Certain soils to be treated may be in unsaturated zones and the method of injection may be based on infiltration or trickling of the solution into the subsurface to provide sufficient contact of the soils with the injected chemicals. Certain soils and conditions will require large amounts of oxidants to destroy soil oxidant demand, while other soils and conditions might not. For example, sandy soils having large grain size might have very little surface area, very little oxidizable compounds and therefore very little soil oxidant demand. On the other hand, silty or clayey soils, which are very fine grained, would have large surface area per unit volume. They are likely to also contain larger amounts of oxidizable compounds and thus have a high soil oxidant demand.

In another embodiment of the invention, activators, such as metals and chelated metal complexes, may also be added either in combination, sequential fashion or multiple sequential steps either to the addition of hydrogen peroxide, the addition of persulfate, or the addition of both hydrogen peroxide and persulfate.

Activators which may be used to enhance the effects of the persulfate/hydrogen peroxide include divalent and trivalent transition metals such as Fe (II), Fe (III), Cu (II), Mn (II) and Zn (II). The metal may be added in the form of a salt or a chelate. Preferred chelants which may be used include ethylenediamine tetraacetic acid, citric acid, phosphate, phosphonates, glucoheptonates, aminocarboxylates, polyacrylates, catechol and nitroacetic acid.

In addition to treatment of soil, the invention is also useful for destroying contaminants in groundwater, process water, waste water or any other environment in which contaminants susceptible to oxidation are found.

In order to describe the invention in more detail, the following examples are set forth:

EXAMPLE 1

A composition was prepared containing 300 ml deionized water and 150 grams of soil—"fill sand" obtained from Nimbus Landscaping Materials, Rancho Cordova, Calif. Approximately 85% of the sand was less than 30 mesh (600 microns). The soil contained 3700 mg/kg total organic carbon (TOC) and 17000 mg/kg iron. The composition was placed in a 500 ml glass, amber bottle and was spiked with a 500 ul aliquant, using a gas-tight glass syringe, of a methanol stock solution containing MTBE, CT, TCA, TCE and benzene such that the initial concentration of each chemical was about 20 mg/l. The bottles were capped and placed on a shaker table for three weeks to equilibrate.

A master batch of 200 g/L sodium persulfate aqueous solution was prepared by dissolving 100 g of sodium persulfate into 500 mL of deionized water. Enough of the sodium persulfate solution, with additional deionized water if needed, was added to the "Persulfate Only" and "Persulfate/Peroxide" test samples to bring the total aqueous volumes to 350 mL with a persulfate concentration of 5 g/L. In addition, 50 g/L of a 17% hydrogen peroxide solution was added to the "Persulfate/Peroxide" test samples. The sample containers were capped, placed on a shaker table, and periodically shaken.

Periodically, one sample from each test group was sacrificed, with approximately 200 mL of the soil-water mixture quickly decanted into a 225 mL centrifuge tube. The sample was then centrifuged at 4400 rpm for 5 minutes. A portion of the resultant aqueous phase then was decanted into HCl-preserved VOA jars. Volatile organic compound concentration analysis was then performed utilizing EPA Method 8260B.

The results, in percent of contaminants removed, are shown in Table 1.

TABLE 1

| Time (days) | Control | Persulfate Only | Persulfate/Peroxide |
|---|---|---|---|
| Benzene | | | |
| 1 | 31.9 | 57.4 | 77.7 |
| 3 | 13.8 | 37.2 | 93.9 |
| 8 | 42.6 | 85.1 | 99.7 |
| 24 | 22.3 | 98.9 | 100.0 |

TABLE 1-continued

| Time (days) | Control | Persulfate Only | Persulfate/Peroxide |
|---|---|---|---|
| Carbon Tetrachloride | | | |
| 1 | 69.0 | 19.0 | 93.3 |
| 3 | 53.4 | 12.1 | 94.8 |
| 8 | 77.6 | 75.9 | 96.7 |
| 24 | 81.0 | 37.9 | 100.0 |
| Trichloroethane | | | |
| 1 | 59.3 | 11.6 | 81.4 |
| 3 | 44.2 | 4.7 | 88.7 |
| 8.0 | 72.1 | 66.3 | 93.8 |
| 24 | 68.6 | 23.3 | 99.6 |
| Trichloroethene | | | |
| 1 | 47.7 | 45.3 | 77.9 |
| 3 | 31.4 | 29.1 | 90.9 |
| 8 | 64.0 | 82.6 | 99.0 |
| 24 | 46.5 | 94.9 | 100.0 |
| MTBE | | | |
| 1 | 4.1 | −9.6 | −9.6 |
| 3 | 4.1 | −9.6 | 11.0 |
| 8 | 4.1 | 4.1 | 32.2 |
| 24 | 4.1 | 11.0 | 69.9 |

EXAMPLE 2

Using the same procedures and materials as in Example 1, batch tests were conducted by adding sodium persulfate and/or H2O2 to 75 g of soil and deionized water that had been spiked with a methanolic solution of VOCs. The total solution volume was 175 mL, giving a soil to liquid ratio of 1:2.3. The initial conditions are given in Table 2A below. The control, Persulfate Only, Very Low H2O2 tests were capped tightly. The H2O2 Only, Low H2O2, and High H2O2 tests were loosely capped for the first 24 hours (to prevent buildup of pressure due to decomposition of H2O2); caps were tightened after 24 hours.

TABLE 2A

| Test ID | Initial Na2S208 | Initial H2O2 (%) | Mole Ratio H2O2:Na2S208 |
|---|---|---|---|
| Control | 0 | 0 | n.a |
| Persulfate Only | 10 | 0 | n.a |
| Peroxide Only | 0 | 2.6 | n.a |
| Very Low Peroxide | 10 | 0.01 | 0.1 |
| Low Peroxide | 10 | 0.65 | 5 |
| High Peroxide | 10 | 2.6 | 20 |

The percent removed for each VOC is given in Table 2B. The percent removed was calculated from the total mass in the aqueous phase and the headspace. The concentration in the headspace was calculated from the aqueous concentration and volume of headspace using Henry's law.

TABLE 2B

| Time (days) | Control | Persulfate Only | Peroxide Only | Very Low Peroxide | Low Peroxide | High Peroxide |
|---|---|---|---|---|---|---|
| Benzene | | | | | | |
| 1 | 9.1 | 42.9 | 97.1 | 63.0 | 96.3 | 99.9 |
| 3 | 63.6 | 67.5 | 98.9 | 80.5 | 99.6 | 100.0 |

TABLE 2B-continued

| Time (days) | Control | Persulfate Only | Peroxide Only | Very Low Peroxide | Low Peroxide | High Peroxide |
|---|---|---|---|---|---|---|
| 8 | 39.0 | >99.8 | 99.4 | 98.7 | 100.0 | 100.0 |
| 23 | 91.6 | >99.9 | 99.9 | >99.9 | 100.0 | 99.9 |
| | | | Carbon Tetrachloride | | | |
| 1 | 25.8 | 4.6 | 99.4 | 43.5 | 97.3 | 99.8 |
| 3 | 78.8 | 48.8 | 99.6 | 70.0 | 98.4 | 99.8 |
| 8 | 55.8 | 95.2 | 99.6 | 78.8 | 99.8 | 99.7 |
| 23 | 98.9 | 96.6 | >99.9 | 99.4 | 98.9 | 99.5 |
| | | | 1,1,1-TCA | | | |
| 1 | 18.3 | 0.0 | 99.2 | 35.8 | 94.8 | 99.7 |
| 3 | 74.2 | 36.7 | 99.6 | 60.8 | 97.0 | 99.8 |
| 8 | 48.3 | 88.3 | 99.6 | 65.0 | 99.6 | 99.8 |
| 23 | 97.4 | 56.7 | 100.0 | 86.7 | 97.7 | 100.0 |
| | | | TCE | | | |
| 1 | 14.3 | 28.6 | 98.5 | 55.7 | 95.4 | 99.9 |
| 3 | 70.7 | 55.0 | 99.2 | 71.4 | 99.1 | 99.9 |
| 8 | 48.6 | 99.3 | 99.4 | 94.1 | 100.0 | 99.8 |
| 23 | 95.5 | >99.8 | 99.9 | >99.9 | 99.8 | 99.9 |
| | | | MTBE | | | |
| 1 | −3.4 | −3.4 | 50.7 | 6.4 | 45.8 | 86.7 |
| 3 | 26.1 | −13.3 | 80.3 | 6.4 | 60.6 | 97.3 |
| 8 | −3.4 | 16.3 | 84.7 | −37.9 | 93.1 | 98.6 |
| 23 | 36.0 | 26.1 | 94.1 | 66.0 | 94.1 | 99.2 |

EXAMPLE 3

A composite soil sample was prepared in a steel bowl by combining equal masses of representative samples of soil collected from a field site. 100 gram portions of the composite were transferred to 250 ml amber glass bottles fitted with Teflon lined caps. Treatment of the samples was performed by mixing the 100 grams of the soil sample with the amount of chemical corresponding to the treatment dosage (see below). Ten ml of de-ionized water was added to each sample to simulate the amount of liquid added during a full-scale injection. After treatment, the samples were allowed to stand at ambient temperature with the cap loosely attached to the bottle to allow the samples to degas. After eight days, a portion of the aqueous component was removed and analyzed for volatile organic compounds using EPA method 8260B.

The chlorinated compounds of concern were: methylene chloride, 1,1,1 tri-chloroethane and, 1,2 di-chloroethane. Results are shown in Table 3.

TABLE 3

| | Control | Treatment A | | Treatment B | |
|---|---|---|---|---|---|
| Contaminant | µg/kg | µg/kg | % reduction | µg/kg | % reduction |
| Methylene chloride | 80,000 | 82,000 | 0 | 25,000 | 98 |
| 1,1,1 Trichloethane | 3,700,000 | 2,000,000 | 46 | 91,000 | 98 |
| 1,1 Dichloroethane | 21,000 | 10,000 | 52 | 2,500 | 98 |

| Treatment A | Iron activated persulfate | 10 ml of a 20% $Na_2S_2O_8$ solution + 10 mL of a 20% $FeSO_4$ solution (yields 2 g of each compound per 100 g soil) |
|---|---|---|

TABLE 3-continued

| Treatment B | Iron/Peroxide activated persulfate | 10 ml of a 20% $Na_2S_2O_8$ solution + 10 mL of a 20% $FeSO_4$ solution + 10 mL of a 20% $H_2O_2$ solution |
|---|---|---|

EXAMPLE 4

Using the procedure described in Example 3, an additional contaminant was evaluated.

The chlorinated compound of concern was: 1,4 chlorobenzene Results are shown in Table 4.

TABLE 4

| | Control | Treatment A | | Treatment B | |
|---|---|---|---|---|---|
| Contaminant | µg/kg | µg/kg | % reduction | µg/kg | % reduction |
| 1,4 Chlorobenzene | 430,000 | 160,000 | 63 | 2,500 | 99 |

| Treatment A | Iron activated persulfate | 20% $Na_2S_2O_8$, 20% $FeSO_4$ |
|---|---|---|
| Treatment B | Iron/Peroxide activated Persulfate | 20% $Na_2S_2O_8$, 20% $FeSO_4$, 20% $H_2O_2$ |

EXAMPLE 5

Decomposition of Sodium Persulfate in the Presence of Hydrogen Peroxide

Persulfate anions are long lived species and can survive from days, weeks and even months in the subsurface. On the other hand, sulfate radicals are short lived species, and once the persulfate is activated to form sulfate radicals, the lifetime of the radical species is less than one second. Although there may be several decomposition pathways for persulfate, a primary route is the formation of sulfate radicals, and subsequent termination of the radical by combination with other radicals or organic species. Thus, measurement of the persulfate decomposition is an indirect determination of the extent of radical formation.

Combinations of sodium persulfate and hydrogen peroxide were added to soil-water slurries, and the subsequent decomposition of sodium persulfate was measured after three days of reaction time. Soil was obtained and combined with water at a 50:50 ratio and placed into glass jars. Sodium persulfate and hydrogen peroxide were added to the jars at varying sodium persulfate concentrations, and hydrogen peroxide to sodium persulfate ratios of 1:10, 1:1 and 10:1. The jars were sealed and placed in the dark. Analysis of the sodium persulfate concentration was conducted on day three utilizing persulfate titration methods.

The results of the study are shown in Table 5.

TABLE 5

Table 1: Persulfate Decomposition As a Function of Peroxide Level

| Initial Persulfate Concentration (ppm) | Initial Mole ratio $Na_2S_2O_8:H_2O_2$ | Persulfate Concentration @ Day 3 (ppm) | % Persulfate Loss |
|---|---|---|---|
| 4000 | 10:1 | 3067 | 23 |
| 4000 | 1:1 | 1370 | 66 |
| 4000 | 1:10 | 60 | 99 |
| 11000 | 10:1 | 7206 | 34 |
| 11000 | 1:1 | 1727 | 84 |

TABLE 5-continued

Table 1: Persulfate Decomposition As a Function of Peroxide Level

| Initial Persulfate Concentration (ppm) | Initial Mole ratio $Na_2S_2O_8$:$H_2O_2$ | Persulfate Concentration @ Day 3 (ppm) | % Persulfate Loss |
|---|---|---|---|
| 11000 | 1:10 | 89 | 99 |
| 22000 | 10:1 | 11434 | 43 |
| 22000 | 1:1 | 3335 | 83 |
| 22000 | 1:10 | 119 | 99 |
| 22000 | 0 | 15007 | 25 |

Results from Table 5 indicate that as the amount of hydrogen peroxide increases, the greater the decomposition of the sodium persulfate, indicating increased formation of sulfate radicals with increasing peroxide concentrations. A wide range of persulfate to hydrogen peroxide may be used in the present invention.

EXAMPLE 6

Using the procedure described in Example 3 additional samples of contaminants were treated.

Acid water refers to a 1% aqueous solution of phosphoric acid. When used 1 ml of this solution was added with the hydrogen peroxide.

The results are shown in the following tables.

TABLE 6A

| Parameters (ug/kg) | Untreated Control | Persulfate with Iron | $H_2O_2$ and Persulfate with Iron |
|---|---|---|---|
| Tetachloroethene | 1,800,000 | 750,000 | 340,000 |
| Trichloroethene | 21,000 | 12,000 | 1,800 |

TABLE 6B

| Parameters (ug/kg) | Untreated Composite | Persulfate with Iron | $H_2O_2$ with Acid Water | $H_2O_2$, Acid Water, & Persulfate |
|---|---|---|---|---|
| 1,1,1-Trichloroethane | 340,000 | 57,000 | 15,000 | 9,200 |
| 1,1,-Dichloroethene | 4,500 | 550 | 170 | 63 |

TABLE 6C

| Parameters (ug/L) | Control Sample | $H_2O_2$ with Acid Water Persulfate | $H_2O_2$ with Acid Water |
|---|---|---|---|
| Diesel Range Organics | 13,000 | 5,500 | 7,800 |

EXAMPLE 7

Using the procedure described in Example 3, samples of contaminants were treated. The following treatments were used.

| Treatment A | 25000 PPM H2O2 | 100 PPM H3PO4 | 80 PPM $Na_2S_2O_8$ |
| Treatment B | 25000 PPM H2O2 | 100 PPM H3PO4 | |

The results are shown in Table 7. ND indicates "none detected" meaning the amounts were below the limits of detection.

TABLE 7

| Contaminant | Control (PPB) | Treatment A | Treatment B |
|---|---|---|---|
| Trichloroethene | 1200 | 17 | 99 |
| cis 1,1 Dichloroethene | 6900 | 4 | 370 |
| 1,1,1 Trichloroethane | 12000 | 810 | 1400 |
| 11 Dichloroethane | 1100 | ND | 250 |
| 1,1 Dichloroethene | 2100 | ND | 180 |
| Tetrachloroethene | 220 | ND | 124 |

EXAMPLE 8

Using the same procedure as in Example 7, an additional sample was evaluated. The results are shown in Table 8.

TABLE 8

| Contaminant | Control (PPB) | Treatment A | Treatment B |
|---|---|---|---|
| Trichloroethene | 2800 | ND | 350 |

What is claimed is:

1. A method for oxidizing a contaminant present in an environmental medium selected from soil, rock, groundwater, wastewater and process water, said method comprising contacting the contaminant with a composition comprising a persulfate and hydrogen peroxide in the absence of a metal or chelated metal activator.

2. The method of claim 1, wherein the persulfate is a monopersulfate or a dipersulfate.

3. The method of claim 1, wherein the persulfate is sodium base, ammonium base, or potassium base.

4. The method of claim 1 wherein the persulfate is sodium persulfate.

5. The method of claim 1 wherein the mole ratio of persulfate to hydrogen peroxide is equal to from 1:20 to 20:1.

6. The method of claim 1 wherein the mole ratio of persulfate to hydrogen peroxide is equal to from 1:10 to 10:1.

7. The method of claim 1 wherein the persulfate and hydrogen peroxide are applied simultaneously to the medium.

8. The method of claim 1 wherein the persulfate and hydrogen peroxide are applied sequentially to the medium.

9. The method of claim 1 wherein the persulfate is applied to the medium prior to the application of the hydrogen peroxide.

10. The method of claim 1 wherein the hydrogen peroxide is applied to the medium prior to the application of the persulfate.

11. The method of claim 1 wherein the persulfate and hydrogen peroxide are applied to the medium sequentially in repeated applications.

12. The method of claim 11 wherein the repeated sequential additions of persulfate and hydrogen peroxide occur continuously.

13. The method of claim 11 wherein the repeated sequential additions of persulfate and hydrogen peroxide are separated by time intervals.

14. The method of claim 1 wherein the environmental medium is selected from soil, rock, groundwater, wastewater and process water.

15. The method of claim 1, wherein the oxidation is performed in situ or ex situ.

16. The method of claim 1, wherein the composition is introduced into the environmental medium in sufficient quantities and under conditions to oxidize substantially all of the contaminants in the medium.

* * * * *